J. W. COPE.
BOTTLE CARRIER.
APPLICATION FILED JULY 1, 1911.

1,026,788.

Patented May 21, 1912.

John W. Cope, Inventor,
by C. A. Snow & Co.
Attorneys.

Witnesses:

UNITED STATES PATENT OFFICE.

JOHN W. COPE, OF CUMBERLAND, MARYLAND.

BOTTLE-CARRIER.

1,026,788.  Specification of Letters Patent.  Patented May 21, 1912.

Application filed July 1, 1911. Serial No. 636,354.

*To all whom it may concern:*

Be it known that I, JOHN W. COPE, a citizen of the United States, residing at Cumberland, in the county of Allegany and State of Maryland, have invented a new and useful Bottle-Carrier, of which the following is a specification.

This invention relates to bottle carriers.

The object of the invention is to provide an article of this character which shall be cheap to manufacture, thoroughly efficient in operation, which may be readily applied to and removed from a bottle, and which shall be positive in the prevention of any accidental disconnection between the bottle and the carrier.

With the above and other objects in view, as will appear as the nature of the invention is better understood, the same consists in the novel construction and combination of parts of a bottle carrier, as will be hereinafter fully described and claimed.

Figure 1:
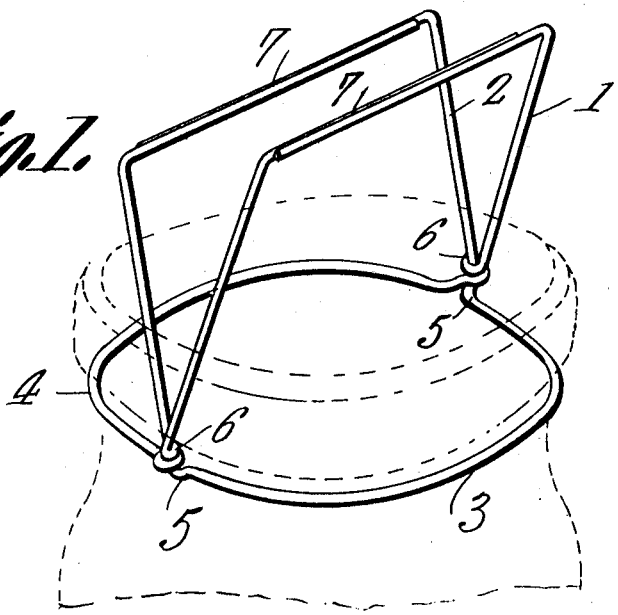
Figure 2:
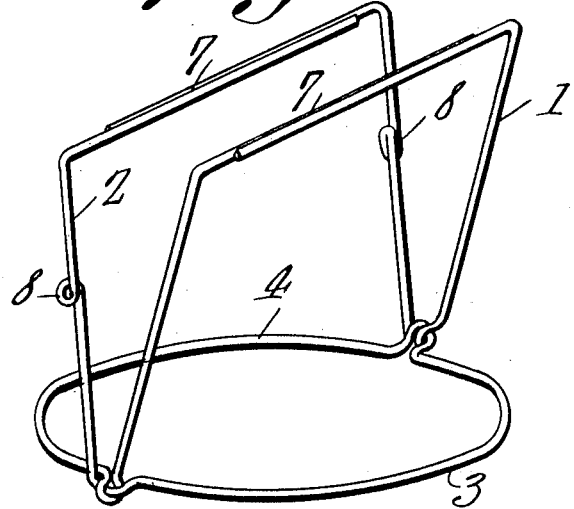

In the accompanying drawing, Figure 1 is a view in perspective of one form of bottle carrier constructed in accordance with the present invention, and showing the same applied to the neck of a bottle, the latter being indicated by dotted lines. Fig. 2 is a perspective detail view of a slightly modified form of the invention.

The carrier shown in Fig. 1, and which is the simpler form, comprises two members each constructed from a single length of wire, and comprising a bail handle 1 and 2 respectively, and a semi-circular bottle-neck engaging clip 3 and 4 respectively disposed at right angles to the handles.

In order to render the device readily applicable to the neck of a bottle when the same is to be transported, and to facilitate removal when desired, it is necessary that the two carrier members should have a sliding relation relative to each other in order that requisite space shall be provided between the clips to permit of their being passed over the mouth rim of the bottle. To accomplish this result, the clip 3 is provided at its point of juncture with the side members of the handle with bends 5, and the clip 4 is provided adjacent to its point of juncture with the side members of its handle with eyes 6 formed by coiling the wire into one or more whirls through which the side members of the handle 2 freely slides, the bends 5 constituting in conjunction with the eyes hinge joints which will permit of the handles having a limited opening and closing movement relative to each other, such movement being in effect only of such scope as will permit the eyes to be moved out of engagement with the bends and slid up upon the side members of the handle 2. The hand-holds 7 may be constructed in any preferred manner as by overlapping the terminals of the two handles and securing them by solder, or otherwise. In this manner the ends of the bail handles have a hinged connection when in normal position and are slidably connected together whereby one handle may be slid upon the other to separate the clips for positioning the carrier upon the bottle.

In the form of the invention shown in Fig. 2 the only difference over that shown in Fig. 1 is that the handle 2 is provided intermediate of its ends with stops 8, formed, in this instance, by providing one or more coils at the points indicated, the object of these stops being to limit the movement of the clip 4 relative to the clip 3.

The particular use to which the device is applicable is for the transportation of milk bottles, although it could be adapted for other purposes and be found highly advantageous in use. The main feature of the invention resides in the simplicity of its construction, the ease with which it may be manufactured, and the certainty of its operation in use.

What is claimed is:

1. A bottle carrier comprising two members each constituting a bail handle and a bottle neck engaging clip, the ends of the bail handles having a sliding connection with each other whereby the clips may be separated for positioning the carrier on a bottle, and whereby upon the said members being in normal position they are adapted to be swung with respect to each other.

2. A bottle carrier comprising two members each bent from a length of wire to form a bail handle and a bottle neck engaging clip, one member at the junction of the side members of the handle and the clip having bends, and the other member at the junction of the side members of the handle and clip having eyes through which the other member passes, whereby the members are hingedly connected and the bail handles may be slid with respect to each other to separate the clips for positioning the carrier upon a bottle.

In testimony that I claim the foregoing as my own, I have hereto affixed my signature in the presence of two witnesses.

JOHN W. COPE.

Witnesses:
A. C. LANDIS,
L. W. NANE.